No. 622,161. Patented Mar. 28, 1899.
W. A. PATTERSON.
COMPRESSING AND BALING APPARATUS.
(Application filed Feb. 7, 1898.)
(No Model.) 2 Sheets—Sheet 1.
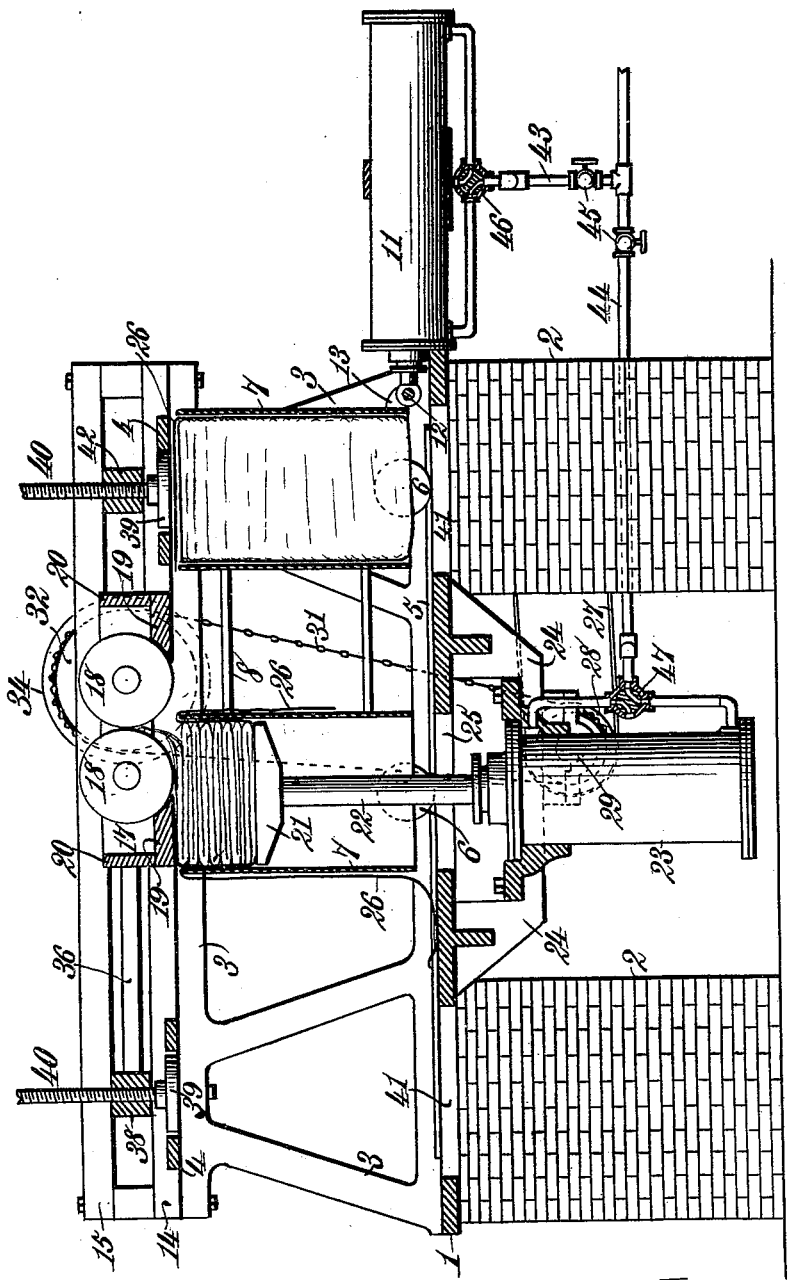
Witnesses.
Robert Everett,
Inventor.
Warren A. Patterson,
By James L. Norris,
Atty.

No. 622,161. Patented Mar. 28, 1899.
W. A. PATTERSON.
COMPRESSING AND BALING APPARATUS.
(Application filed Feb. 7, 1898.)
(No Model.) 2 Sheets—Sheet 2.
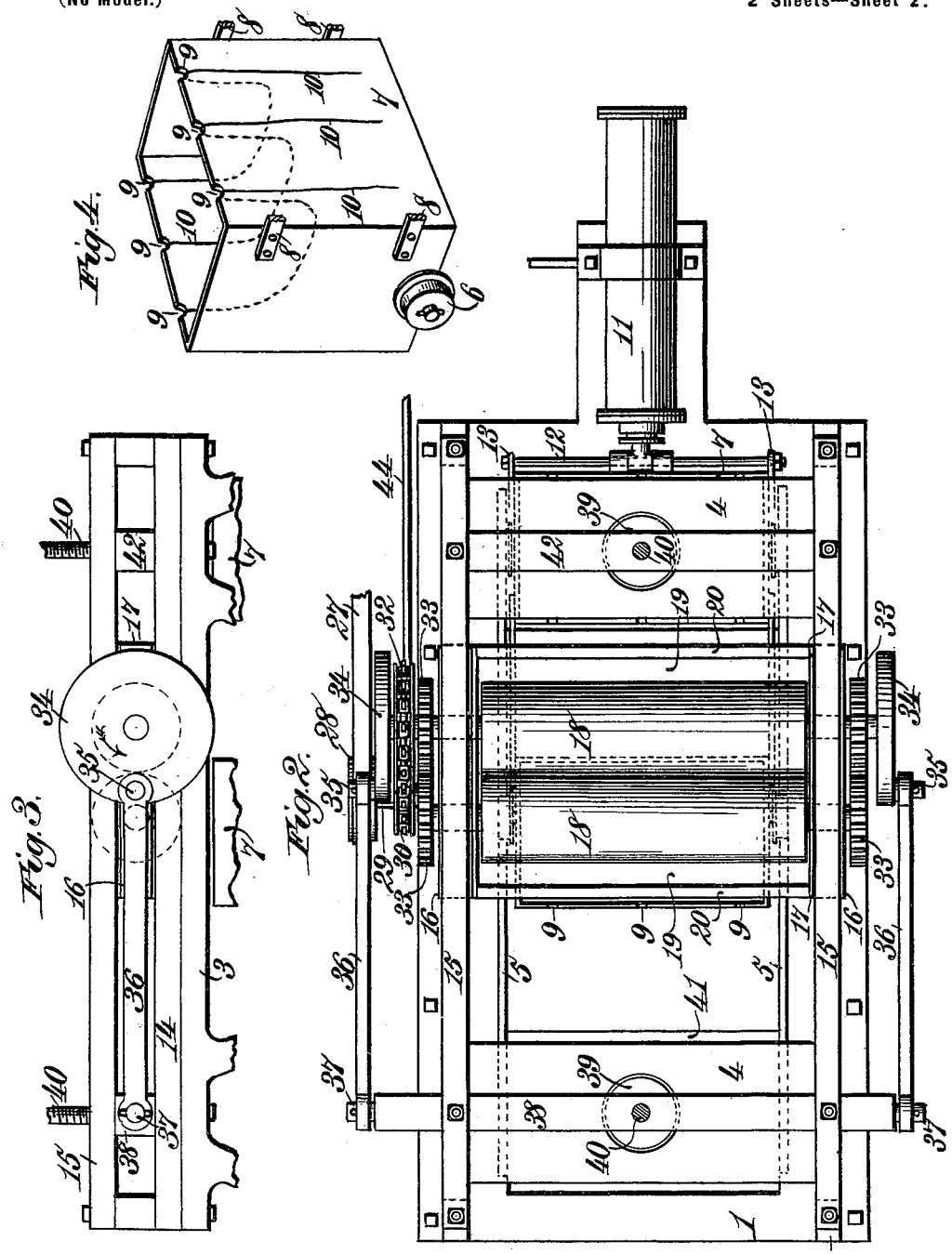
Witnesses.
Inventor,
Warren A. Patterson,
By James L. Norris,
Atty.

UNITED STATES PATENT OFFICE.

WARREN A. PATTERSON, OF HOUSTON, TEXAS.

COMPRESSING AND BALING APPARATUS.

SPECIFICATION forming part of Letters Patent No. 622,161, dated March 28, 1899.

Application filed February 7, 1898. Serial No. 669,414. (No model.)

*To all whom it may concern:*

Be it known that I, WARREN A. PATTERSON, a citizen of the United States, residing at Houston, in the county of Harris and State of Texas, have invented new and useful Improvements in Compressing and Baling Apparatus, of which the following is a specification.

My invention relates to compressing and baling apparatus, and has for its special object to provide a rapid, economical, and thoroughly effective means for compressing cotton and expelling air therefrom as it is delivered from the gin into a bale chamber or box in which the bale is formed in successive laps or folds and the bagging and ties applied, so that the cotton may be continuously made ready for export as soon as ginned, and thus avoid the wastage and delays of numerous handlings.

The invention consists in features of construction and novel combinations of parts in compressing and baling machinery, as hereinafter described and claimed.

In the annexed drawings, illustrating the invention, Figure 1 is a part sectional side elevation of my improved compressing and baling apparatus for handling cotton or other material. Fig. 2 is a plan of the same. Fig. 3 is a side elevation of the upper part of the apparatus. Fig. 4 is a perspective of one of the baling-chambers.

In the drawings the reference-numeral 1 designates a bed-plate that is firmly secured on a support or supports 2, preferably of masonry. On this bed-plate 1 there are secured vertical side frames 3, that are preferably braced by means of transversely-arranged stays or bars 4 at the top. Secured on the bed-plate 1, between the side frames 3, there is a pair of track-rails 5 for the flanged wheels 6 of two connected bale chambers or boxes 7, that are adapted to be moved forward and back to alternately receive the compressed cotton or other material and mold it into a compact bale.

The movable baling-chambers 7 are spaced apart a convenient distance to permit removal of a bale from one chamber while the other is being packed with material, and, in order that they may be moved back and forth together, they are connected by means of bars 8 or in any other suitable manner. The top of each baling-chamber may be provided with guide-notches 9, Fig. 4, to receive and retain in place the wires or ties 10 that are to bind the bales.

To move the connected bale-chambers 7 forward and back, there is provided a steam-cylinder 11, Figs. 1 and 2, having its piston connected with a transversely-arranged rod or bar 12, supported in ears 13 on one of the bale-chambers.

At their tops the side frames 3 have longitudinally-extended guide-bars 14 and 15 supported thereon, there being on each side of the apparatus a lower guide-bar 14 and an upper guide-bar 15, suitably spaced apart, as shown. These guide-bars 14 and 15 afford ways for lateral projections 16, Figs. 2 and 3, on a sliding carriage 17, in which are journaled the shafts of a pair of compressing and fold-laying rollers 18, which are in close surface contact for compressing the cotton fed down between them direct from a gin or condenser and for laying the compressed bat or sheet in successive folds or laps within a baling-chamber 7 immediately below said rollers. In compressing the fluffy ginned cotton between these rolls 18 the air will be rolled out or expelled and the cotton will be compacted and forced continuously into that one of the baling chambers or boxes 7 which is in position beneath the compressing and fold-laying rolls. The lower portions of the rollers 18 are arranged to operate between a pair of guide and pressure plates 19, Fig. 1, that are secured to and carried by front and rear cross-bars 20 of the roller-carriage. These plates 19 are extended horizontally in proximity to the top of the baling-chamber and have a movement over the same, with the reciprocations of the roller-carriage, so as to assist in laying the compressed cotton in folds or laps and to exert such pressure thereon as to exclude the air and prevent the cotton from expanding during the filling or packing of the bale-chamber. One edge of each plate 19 is so close to the adjacent compressing-roller as to prevent the cotton from wrapping around the rolls as they revolve. These plates 19 serve also to direct the cotton into the baling chamber or box 7, where it accumulates in successive laps or folds on a vertically-movable platen 21, carried by the piston-rod 22 of a vertically-arranged steam-cylinder 23, that may be suspended from brackets 24 or be otherwise supported beneath an opening 25 in the bed-plate of the apparatus.

Before either baling-chamber 7 is moved beneath the compressing and fold-laying rollers 18 and pressure-plates 19 a number of binding wires, cords, or other suitable ties 10 are laid in the guide-notches 9 and extended across the open top of the baling box or chamber and with a sufficient length of each cord, wire, or tie hanging down on the outside of said chamber a suitable distance, as shown in Fig. 4. The bagging 26, Fig. 1, is then laid on across the top of the baling box or chamber, leaving enough to hang down over the sides to provide for covering the sides of the bale as it is progressively formed and also enough to cover the top of the completed bale. After the ties and bagging have been thus adjusted in position the baling box or chamber will be forced under the compression-rollers 18 by admitting steam to the proper end of the cylinder 11 through any suitable passages provided for that purpose. The baling-chamber that is to be filled being now in position, with bagging and ties properly adjusted, steam will be admitted to the cylinder 23 in such manner as to force the platen 21 upward through the bed-plate opening 25 into the open bottom of the baling chamber or box and upward therein to the full stroke of said platen, preferably about five inches short of the top of the box or chamber. Cotton is now fed in between the rollers 18 and under the pressure to which this cotton is thus subjected the air is rolled out or expelled and the compressed cotton is forced down onto the bagging and therewith into the baling-chamber against the platen 21, which gradually recedes as the baling-chamber fills up. At the same time the roller-carriage and attached pressure-plates 19 are caused to reciprocate across the top of the baling-chamber, thereby laying the compressed cotton bat or sheet in successive folds or laps, as indicated in Fig. 1. It will be observed that as the cotton comes through the compressing-rollers 18 the air is all expelled and that as the rollers travel to and fro to lay the cotton in folds or laps the pressure-plates 19, constituting the bottom of the roller-carriage, will alternately press down on the cotton immediately after it passes from between the rollers. This pressure of the plates 19 is maintained during the whole of the carriage movement in both directions, forward and back, first by one pressure-plate or one end of the carriage-bottom and then by the other. This prevents the cotton from expanding after entering the bale-chamber and keeps the air from getting into it. Thus by means of the compressing-rollers and their carriage the air is not only expelled from the cotton, but is furthermore effectually excluded during the filling of the bale-chamber. The roller-carriage being mounted in close proximity to the open top of the bale-chamber and being held down by the guide-bars 14 and 15, it will obviously afford the necessary resistance for effective compression of the cotton against the movable platen 21 of the bale-chamber.

The pressure-plates 19 are rigid with the reciprocating carriage 17, in which the compression-rollers 18 are mounted, and the said rollers are between and in close proximity to the two pressure-plates, the lower portion of each roll-periphery being in the same horizontal plane as the under sides of the two rigid pressure-plates. Thus these compression-rollers and pressure-plates constitute an upper platen for exerting a baling-pressure on the cotton that is in the bale-chamber and at the same time by the reciprocations of the carriage in which they are mounted they also act to lay the bat of compressed cotton into folds or laps as fed into the baling-chamber in which the bale is fully formed.

The power for driving the compressing and fold-laying rollers 18 may be applied by means of suitable belting 27, Fig. 2, onto a pulley 28 on a short shaft 29, that carries a sprocket-wheel 30, which connects by chain belting 31, Fig. 1, with a sprocket-wheel 32 on the shaft of one of the said compressing-rollers. The shafts of the compressing and fold-laying rollers 18 are connected by spur-gears 33 at both ends, as shown in Fig. 2, and the said rollers are in surface contact, so that by rotation in the proper direction they will cause the cotton to be compressed and fed downward into the baling-chamber.

On the opposite ends of one of the roller-shafts are secured disks 34, having eccentrically-placed wrists 35 thereon. These wrists have links 36 pivoted thereon, and the said links connect loosely with fixed pivots 37, Figs. 2 and 3, on the ends of a cross-bar 38, that is supported between the guide-bars 14 and 15 near one end of the apparatus. It will be obvious that as the disks 34 rotate with the roller-shaft on which they are secured the eccentric attachment of the links 36 to said disks will cause the roller-carriage to reciprocate above the baling-chamber, thereby laying the cotton-bat in folds or laps as it is fed down from between the compressing-rollers. By arranging the operating mechanism of the compressing-rollers and reciprocating roller-carriage outside the side frames of the apparatus, as shown in Fig. 2, the space between said frames is left entirely clear for passage of the baling-chambers forward and back beneath the rollers 18, as required.

When one baling chamber or box 7 has been sufficiently filled and the platen 21 has fully receded, steam is to be turned into the cylinder 11 to remove the filled baling-chamber and bring the second one into position beneath the compressing and fold-laying rollers. The operations already described are then repeated with that baling-chamber. As the filled baling-chamber passes from beneath the roller-carriage the portion of bagging that hangs over the forward side of said chamber should be lifted by an attendant and held upward, so that in the passage of the baling-chamber beneath the bars 4 the said overhanging portion of bagging will be thereby turned backward along and over the top of the completed bale. After this the bale-ties will be securely fastened. While the filled baling-chamber is at rest beneath the bars 4 a plunger 39, operated by a screw 40 or otherwise, may be caused to descend upon the bale and force it out of the bottom of the baling-chamber and downward through an opening 41 in the bed-plate 1, each end portion of which is provided with one of said openings located above the space between the piers 2, that support the compression and baling apparatus. The plunger-operating screws 40 may be supported in cross-bars 38 42, or in lieu of such screws the bale-expelling plungers 39 may be actuated by any suitable mechanism.

The steam or other fluid pressure for operating the pistons of the cylinders 11 and 23 may be supplied through pipes 43 44, Fig. 1, provided with hand-valves 45 and communicating, respectively, with four-way cocks 46 and 47, that are arranged to permit of a proper operation for steam supply and exhaust, as required.

After a bale has been expelled from a bale-chamber it is only necessary to sew in the bale-heads, and thus a perfect package or bale is quickly made ready for transportation. The operations described are repeated indefinitely, first with one baling-chamber and then the other.

One man only is required to operate the press and can easily give it all the attention that is necessary. Obviously the large wastage incident to frequent handlings of cotton is avoided by baling it immediately and continuously as it comes direct from the gin, and by the thorough pressing out of the air during the compressing, lapping, and baling operations I get a compressed bale having a density of about thirty-five pounds to the cubic foot.

What I claim as my invention is—

1. In a compressing and baling apparatus, the combination with two connected and movable bale-chambers, of a reciprocating carriage supported immediately above said bale-chambers, rigid pressure-plates secured to the under side of said carriage at its opposite ends, compression-rollers mounted in said carriage between and close to the inner edges of said pressure-plates and with the lower portion of each roll-periphery in the same horizontal plane as the under sides of said plates to constitute therewith an upper press-platen as well as for compressing cotton and laying it in laps or folds in one of the bale-chambers, mechanism for moving the bale-chambers alternately beneath the roller-carriage, and a lower movable platen to enter the bale-chamber that is in position to be filled and to recede therefrom as said chamber is gradually packed with material, substantially as described.

2. In a compressing and baling apparatus, the combination of a reciprocating carriage having rigid pressure-plates secured to the under side of its opposite ends and a pair of compressing and fold-laying rollers mounted between and close to the inner edges of said pressure-plates to constitute therewith, an upper press-platen, a frame having guide-ways in which said carriage is mounted, two connected bale-chambers open at top and bottom, a steam-cylinder having its piston connected with said bale-chambers to move them alternately beneath said rollers and pressure-plates, and a lower movable platen to enter the bale-chamber that is in position to be packed, substantially as described.

3. In a compressing and baling apparatus, the combination of a reciprocating carriage having rigid pressure-plates secured to the under side of its opposite ends and a pair of compressing and fold-laying rollers mounted between and close to the inner edges of said pressure-plates to constitute therewith an upper press-platen, a frame having guide-ways in which said carriage is mounted to reciprocate horizontally, two connected bale-chambers open at top and bottom and adapted to be moved alternately into position beneath the said rollers and pressure-plates, a lower movable platen to enter the bale-chamber that is in position to be packed, a vertical steam-cylinder having its piston connected with said lower platen, and a horizontal steam-cylinder having a piston connected with one of the bale-chambers, substantially as described.

4. In a compressing and baling apparatus, the combination of a reciprocating carriage having rigid pressure-plates secured to the under side of its opposite ends and a pair of compressing and fold-laying rollers mounted in said carriage between and close to the inner edges of said pressure-plates to constitute therewith an upper press-platen, a frame having guideways in which said carriage is mounted, driving mechanism for the compression and fold-laying rollers, mechanism for causing reciprocation of the carriage from the rotation of said rollers, two connected bale-chambers, mechanism for moving said bale-chambers alternately beneath the said carriage and its rollers and pressure-plates, and a lower movable platen to enter the bale-chamber that is in position to be filled and to recede as said chamber is packed with material from the said rollers, substantially as described.

5. In a compressing and baling apparatus, the combination of two connected and movable bale-chambers mounted on wheels, an elevated bed-plate having tracks for said wheels and provided with vertically-extended side frames having guideways therein, a reciprocating carriage mounted in said guideways, rigid pressure-plates secured horizontally to the under side of said carriage at its opposite ends, a pair of compressing and fold-laying rollers mounted in said carriage between and close to the inner edges of said pressure-plates, driving mechanism for said rollers, means for causing reciprocation of the roller-carriage from rotation of said rollers, and a lower movable platen to enter the bale-chamber that is in position for baling, substantially as described.

6. In a compressing and baling apparatus, the combination of a reciprocating carriage, a pair of compressing and fold-laying rollers mounted in said carriage and connected by spur-gears to rotate together, driving mechanism for said rollers, a disk on one of the roller-shafts, a link having one end eccentrically connected with said disk and its other end connected with a fixed pivot, two bale-chambers alternately movable to a position beneath the roller-carriage, a movable platen to enter the bale-chamber that is in position to be packed, and a plunger for removing a bale from the other chamber, substantially as described.

7. In a compressing and baling apparatus, the combination of a reciprocating carriage having mounted therein a pair of compressing and fold-laying rollers, spur-gears connecting said rollers at both ends, disks mounted on the ends of one of the roller-shafts and provided with wrists, links connected with said wrists and with fixed pivots on the frame of the apparatus, gearing for driving the said roller-shaft, two bale-chambers alternately movable to a position beneath the roller-carriage, and a movable platen to enter the bale-chamber that is in position to be filled and to recede therefrom as said chamber is gradually packed with material from the compressing and fold-laying rollers, substantially as described.

8. In a compressing and baling apparatus, the combination of an elevated bed-plate provided with openings at its center and ends and having track-rails on its upper side, frames supported above said bed-plate on each side and provided with longitudinal guideways, a reciprocating carriage mounted in said guideways, rigid pressure-plates secured to the under side of said carriage at its opposite ends, a pair of compressing and fold-laying rollers mounted in said carriage between and close to the inner edges of said pressure-plates to constitute therewith an upper press-platen, two connected bale-chambers having wheels to run on the track-rails of the elevated bed-plate, mechanism for moving said bale-chambers alternately beneath said carriage, a movable lower platen to enter the bale-chamber that is in position to be packed and to recede therefrom as the bale is formed in said chamber, and plungers located at opposite ends of the elevated bed-plate above the end openings therein and adapted to be operated to expel a bale from a bale-chamber, substantially as described.

In testimony whereof I have hereunto set my hand in presence of two subscribing witnesses.

WARREN A. PATTERSON.

Witnesses:
CHAS. B. H. COVEY,
R. R. DANCY.